US010386860B2

(12) United States Patent
Wu

(10) Patent No.: US 10,386,860 B2
(45) Date of Patent: Aug. 20, 2019

(54) GRAVITY CENTER ADJUSTABLE DEVICE, AND GRAVITY CENTER SELF-ADJUSTING DEVICE AND ELECTRONIC DEVICE USING THE SAME

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Wen-Bing Wu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 183 days.

(21) Appl. No.: 15/688,993

(22) Filed: Aug. 29, 2017

(65) Prior Publication Data

US 2019/0033894 A1 Jan. 31, 2019

(30) Foreign Application Priority Data

Jul. 31, 2017 (CN) .......................... 2017 1 0640840

(51) Int. Cl.
*G05D 3/12* (2006.01)
*G03B 17/56* (2006.01)
*G03B 21/14* (2006.01)
*G06F 21/00* (2013.01)

(52) U.S. Cl.
CPC ........... *G05D 3/127* (2013.01); *G03B 21/145* (2013.01); *G06F 21/00* (2013.01); *G03B 17/561* (2013.01); *G09G 2320/0693* (2013.01)

(58) Field of Classification Search
CPC ...... G03B 5/00; G03B 21/145; G03B 17/561; G06F 1/1626; G06F 21/00; G05D 1/0268; G05D 3/127; H05K 7/12; G09G 2320/0693
See application file for complete search history.

(56) References Cited

U.S. PATENT DOCUMENTS

| | | | | |
|---|---|---|---|---|
| 9,342,108 B2* | 5/2016 | Rothkopf | .............. | G06F 1/1656 |
| 9,432,492 B2* | 8/2016 | Peterson | .............. | H04B 1/3888 |
| 9,505,032 B2* | 11/2016 | Ely | ........................... | B06B 3/00 |
| 2009/0290077 A1* | 11/2009 | Shimizu | ................. | F16M 11/10 |
| | | | | 348/836 |
| 2013/0073095 A1* | 3/2013 | King | ..................... | H04M 1/185 |
| | | | | 700/279 |

* cited by examiner

*Primary Examiner* — Dimary S Lopez-Cruz
*Assistant Examiner* — Ingrid D Wright
(74) *Attorney, Agent, or Firm* — ScienBiziP, P.C.

(57) ABSTRACT

A gravity center adjustable device comprises a driving member, and two gravity center adjusting members. The driving member comprises a driving main body, two transmission shafts, and two gear wheels. Each gear wheel is coiled around a transmission shaft. Each gravity center adjusting member comprises a gravity center adjusting shaft, and two weight balls. The gravity center adjusting shaft comprises a rack shaft, teeth of the rack shaft are engaged with those of the gear wheel, thus when the gear wheel rotates, the rack shaft will move around along its own axial relative to the gear wheel. A gravity center self-adjusting device and an electronic device using the gravity center adjustable device are also provided.

21 Claims, 8 Drawing Sheets

GRAVITY CENTER ADJUSTABLE DEVICE, AND GRAVITY CENTER SELF-ADJUSTING DEVICE AND ELECTRONIC DEVICE USING THE SAME

FIELD

The subject matter herein generally relates to a gravity center adjustable device, a gravity center self-adjusting device using the gravity center adjustable device, and an electronic device using the gravity center self-adjusting device.

BACKGROUND

Electronic device, such as a smart phone or a panel computer, tends to have a large screen and glass. The electronic device may be dropped, causing the display screen or glass to be broken. Therefore, an electronic device protected against this is needed.

BRIEF DESCRIPTION OF THE DRAWINGS

Implementations of the present technology will now be described, by way of example only, with reference to the attached figures.

DETAILED DESCRIPTION

Figure 1:
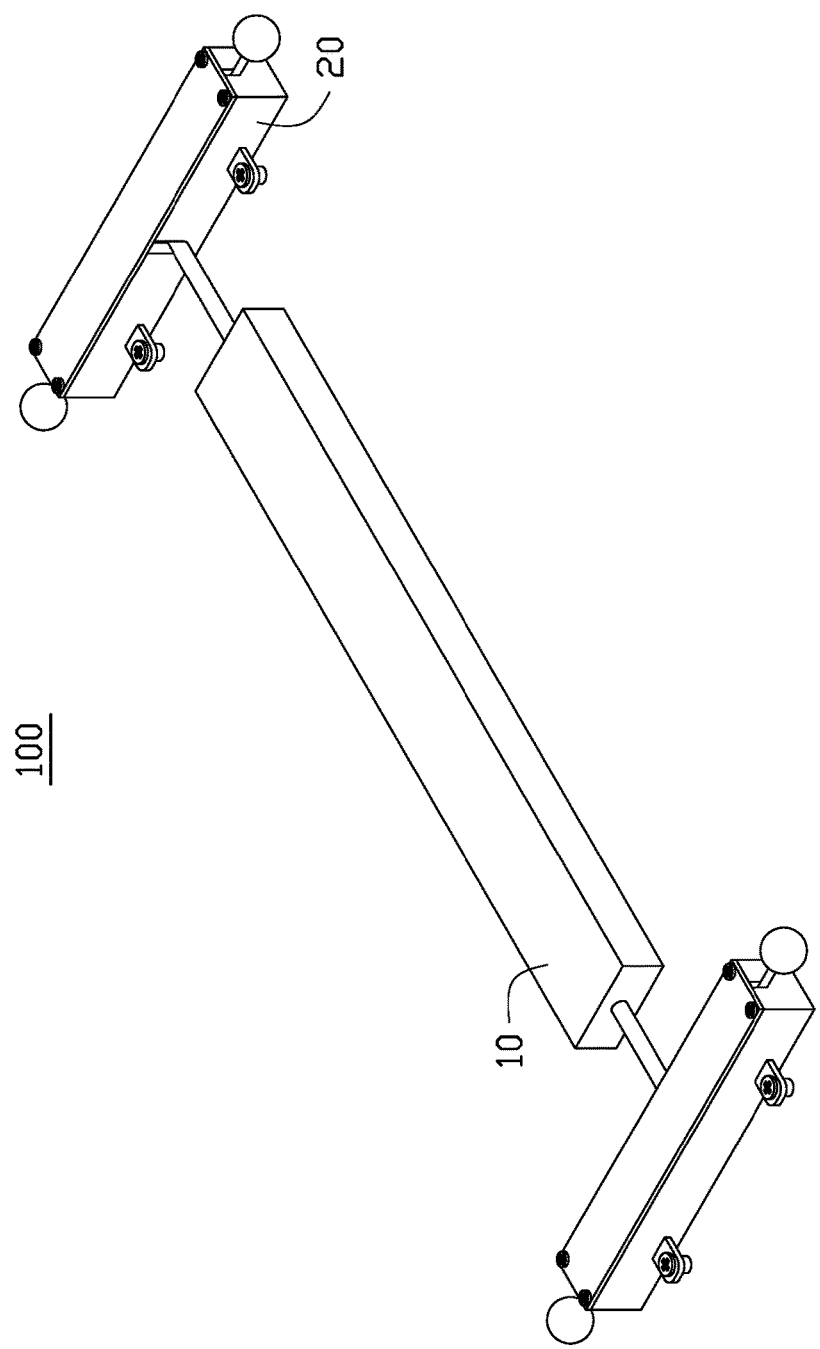
FIG. 1 is a diagrammatic view of an exemplary embodiment of a gravity center adjustable device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better. The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising" when utilized, means "including, but not necessarily limited to"; it specifically indicates open-ended inclusion or membership in the so-described combination, group, series, and the like.

FIG. 1 illustrates an exemplary embodiment of a gravity center adjustable device 100 comprising a driving member 10 and two gravity center adjusting members 20. The two gravity center adjusting members 20 are secured to two opposite ends of the driving member 10 respectively. The two gravity center adjusting members 20 are configured to adjust the gravity center of the gravity center adjustable device 100. The driving member 10 is configured to drive the two gravity center adjusting members 20 to adjust the gravity center of the gravity center adjustable device 100.

The two gravity center adjusting members 20 are roughly parallel with each other, and the two gravity center adjusting members 20 both are perpendicular to the driving member 10. In other words, the gravity center adjustable device 100 has an "I" shape.

In at least one exemplary embodiment, the driving member 10 is a motor.

Figure 2:
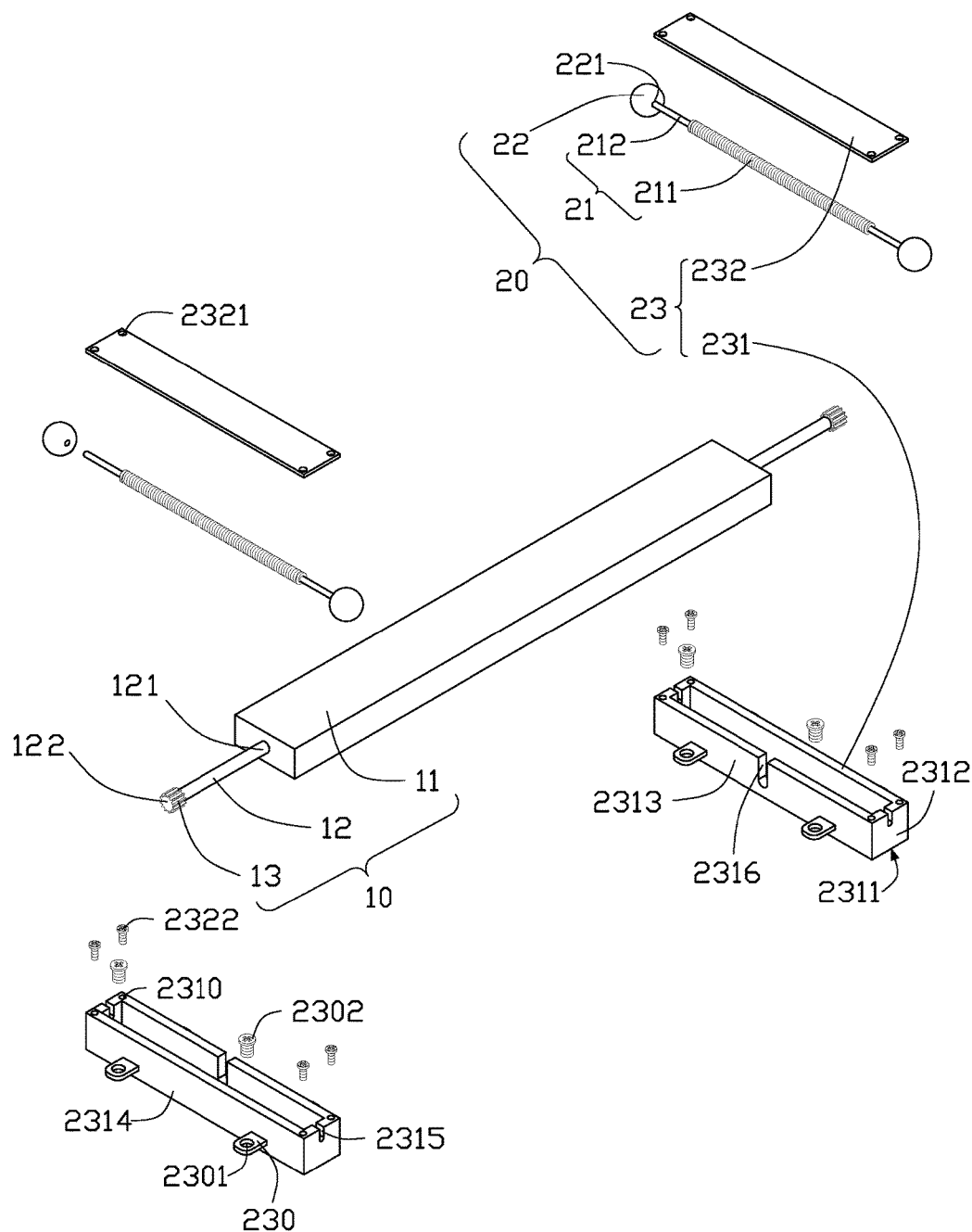
FIG. 2 is an exploded perspective view of the gravity center adjustable device of FIG. 1.
Figure 3:
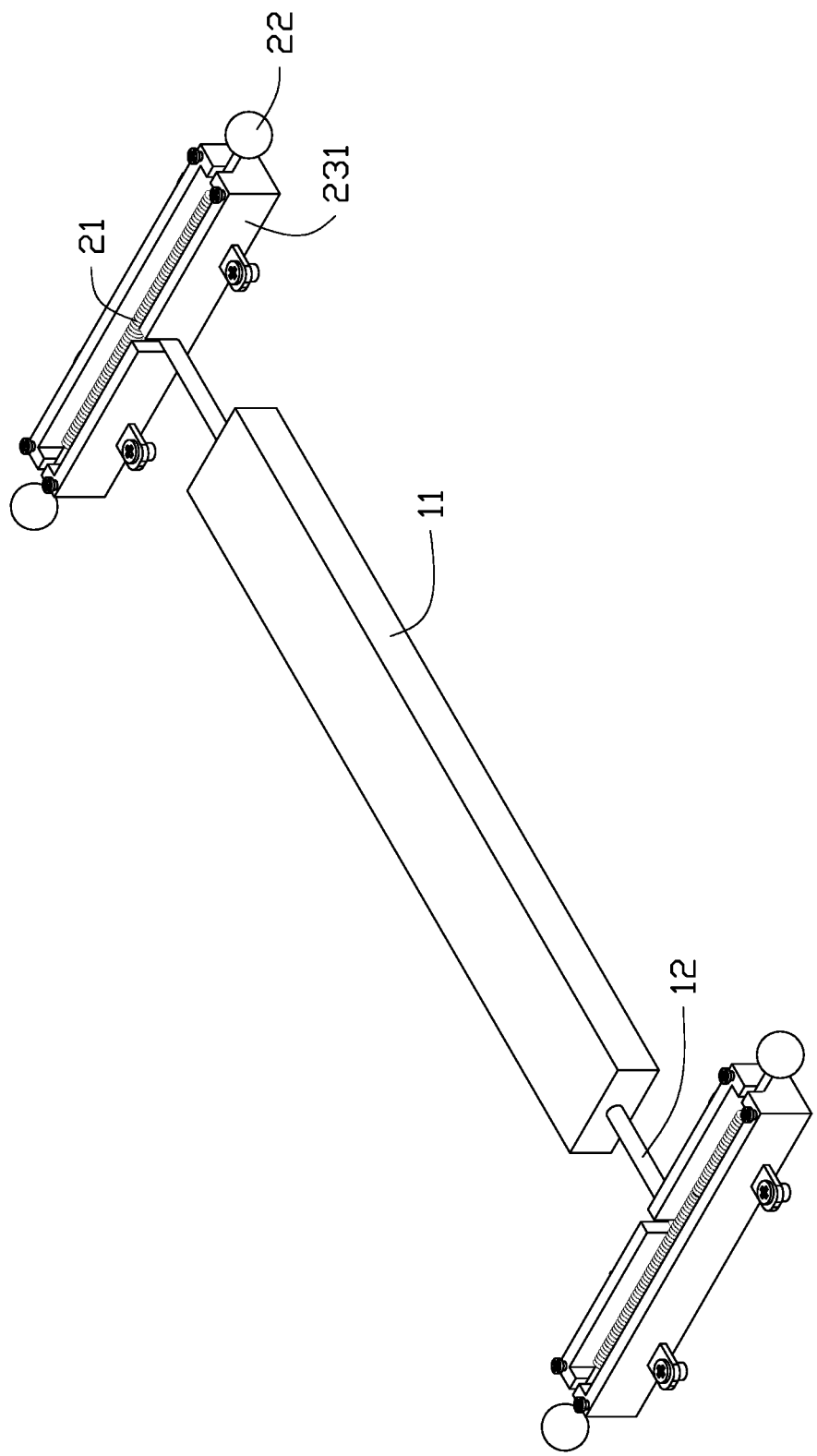
FIG. 3 is the device of FIG. 1 without box cover.

Referring to FIG. 2 and FIG. 3, the driving member 10 comprises a driving main body 11, two transmission shafts 12, and two gear wheels 13. The two transmission shafts 12 are secured to two opposite ends of the driving main body 11 respectively. Each one of the two transmission shafts 12 comprises a first end 121 secured to the driving main body 11, and a second end 122 opposite to the first end 121. Each one of the two gear wheels 13 is coiled around the second end 122 of each one of the two transmission shafts 12. The driving main body 11 drives the two transmission shafts 12 revolve on their own axes, the two gear wheels 13 rotate along with the transmission shaft 12.

Each one of the two gravity center adjusting members 20 comprises a gravity center adjusting shaft 21, two weight balls 22 secured to two opposite ends of the gravity center adjusting shaft 21 respectively, and a gravity center adjusting box 23. The gravity center adjusting shaft 21 passes through the gravity center adjusting box 23, and the two weight balls 22 are outside of the gravity center adjusting box 23.

The gravity center adjusting shaft 21 comprises a rack shaft 211, and two smooth shafts 212 secured to two opposite ends of the rack shaft 211. Each one of the weight balls 22 is fixed on an end of each one of the two smooth shafts 212 away from the rack shaft 211. Teeth of the rack shaft 211 are engaged with those of the gear wheel 13, when the gear wheel 13 is rotating, the rack shaft 211 will move around along its own axial relative to the gear wheel 13.

In at least one exemplary embodiment, the two smooth shafts 212 have a same length.

Each one of the weight balls 22 comprises a first fixing hole 221. An end of a smooth shaft 212 away from the rack shaft 211 is inserted into a first fixing hole 221 of a weight ball 22. In at least one exemplary embodiment, the weight balls 22 have a same weight.

The gravity center adjusting box 23 comprises a box slot 231, and a box cover 232 covering the box slot 231.

The box slot 231 comprises a bottom wall 2311, two first side walls 2312 parallel with each other, a second side wall 2313, and a third side wall 2314 parallel with the second side wall 2313. The second side wall 2313 and the third side wall 2314 are located between the two first side walls 2312, and the two first side walls 2312 are located between the second side wall 2313 and the third side wall 2314. All of the two first side walls 2312, the second side wall 2313, and the third side wall 2314 are perpendicular to the bottom wall 2311. The box cover 232 covers a side of the box slot 231 away from the bottom wall 2311.

Each one of the two first side walls 2312 comprises a first notch 2315. The first notch 2315 is formed on a side of the first side wall 2312 away from the bottom wall 2311. A size of the first notch 2315 is equal to or slightly bigger than a cross-sectional dimension of the smooth shaft 212, thus the smooth shaft 212 can be received in the first notch 2315. Each smooth shaft 212 of a gravity center adjusting shaft 21 is slidably and rotatably received in a first notch 2315, thus the gravity center adjusting shaft 21 is supported on the two first side walls 2312 of the box slot 231, and the rack shaft 211 is inside of the box slot 231. As the smooth shaft 212 is slidably received in the first notch 2315, the gravity center adjusting shaft 21 can slide relative to the first side wall 2312, in other words, the gravity center adjusting shaft 21 can slide around relative to the gravity center adjusting box 23.

The second side wall 2313 comprises a second notch 2316. The second notch 2316 is formed on a side of the second side wall 2313 away from the bottom wall 2311. A size of the second notch 2316 is equal to or slightly bigger than a cross-sectional dimension of the transmission shaft 12, thus the transmission shaft 12 can be received in the second notch 2316. The transmission shaft 12 is rotatably received in the second notch 2316, the first end 121 of the transmission shaft 12 is outside of the box slot 231, and the second end 122 of the transmission shaft 12 is inside of the box slot 231. The gear wheel 13 coiled around the second end 122 overhangs inside of the box slot 231, and the transmission shaft 12 is perpendicular to the second side wall 2313. In at least one exemplary embodiment, the gear wheel 13 may overhang below the rack shaft 211 (shown in FIG. 4 and FIG. 5). In other exemplary embodiment, the gear wheel 13 may overhang above the rack shaft 211.

In at least one exemplary embodiment, the box slot 231 further comprises at least one fixing plate 230. The fixing plate 230 is secured to the bottom side of the second side wall 2313 and/or the bottom side of the third side wall 2314. The fixing plate 230 comprises a second fixing hole 2301. The gravity center adjusting box 23 further comprises at least one fixing piece 2302. The fixing piece 2302 matches with the second fixing hole 2301 to fix box slot 231 on other member, such as a housing 301 (shown in FIG. 8).

The box cover 232 defines at least one third fixing hole 2321. The box slot 231 defines at least one fourth fixing hole 2310 away from the bottom wall 2311. The gravity center adjusting box 23 further comprises at least one fastener 2322. The third fixing hole 2321, the fourth fixing hole 2310, and the fastener 2322 match with each other to fix the box cover 232 onto the box slot 231.

Figure 4:
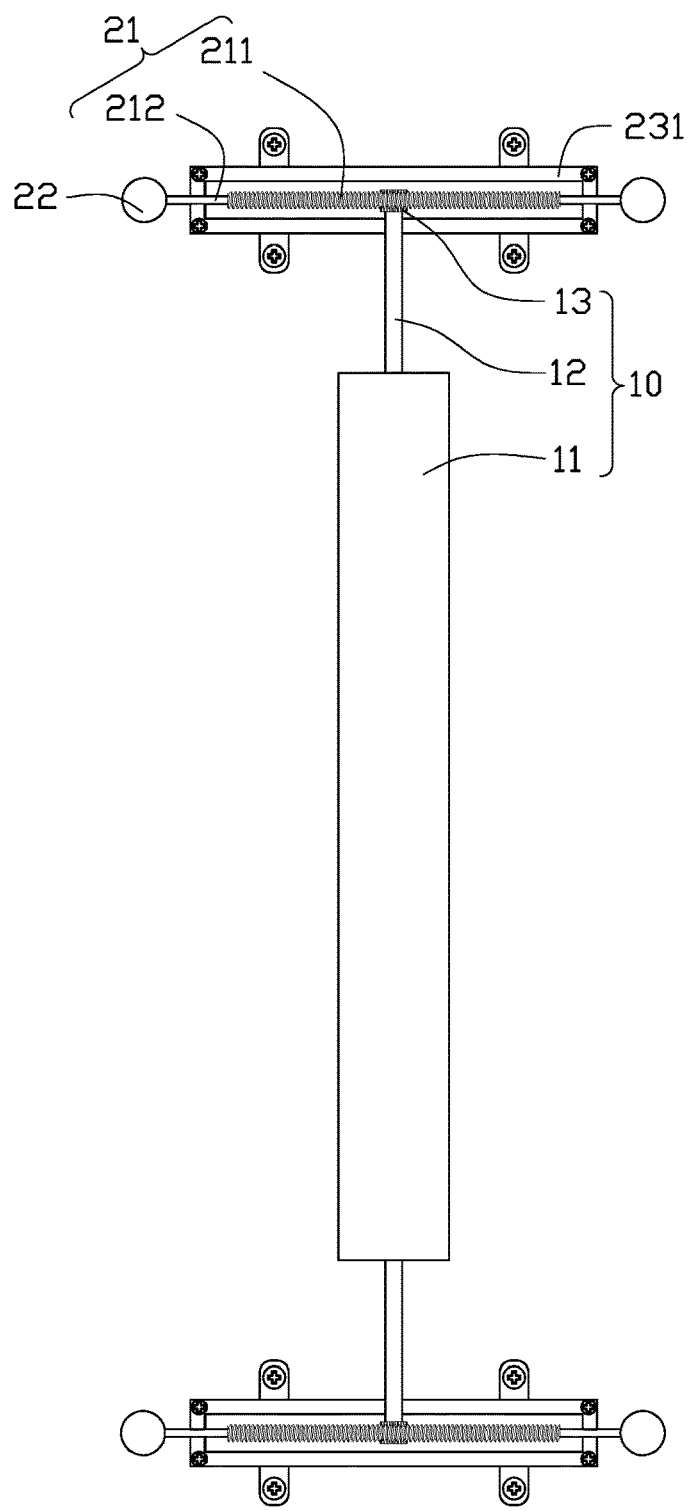
FIG. 4 is a diagrammatic view of the device of FIG. 3 at an initial status.
Figure 5:
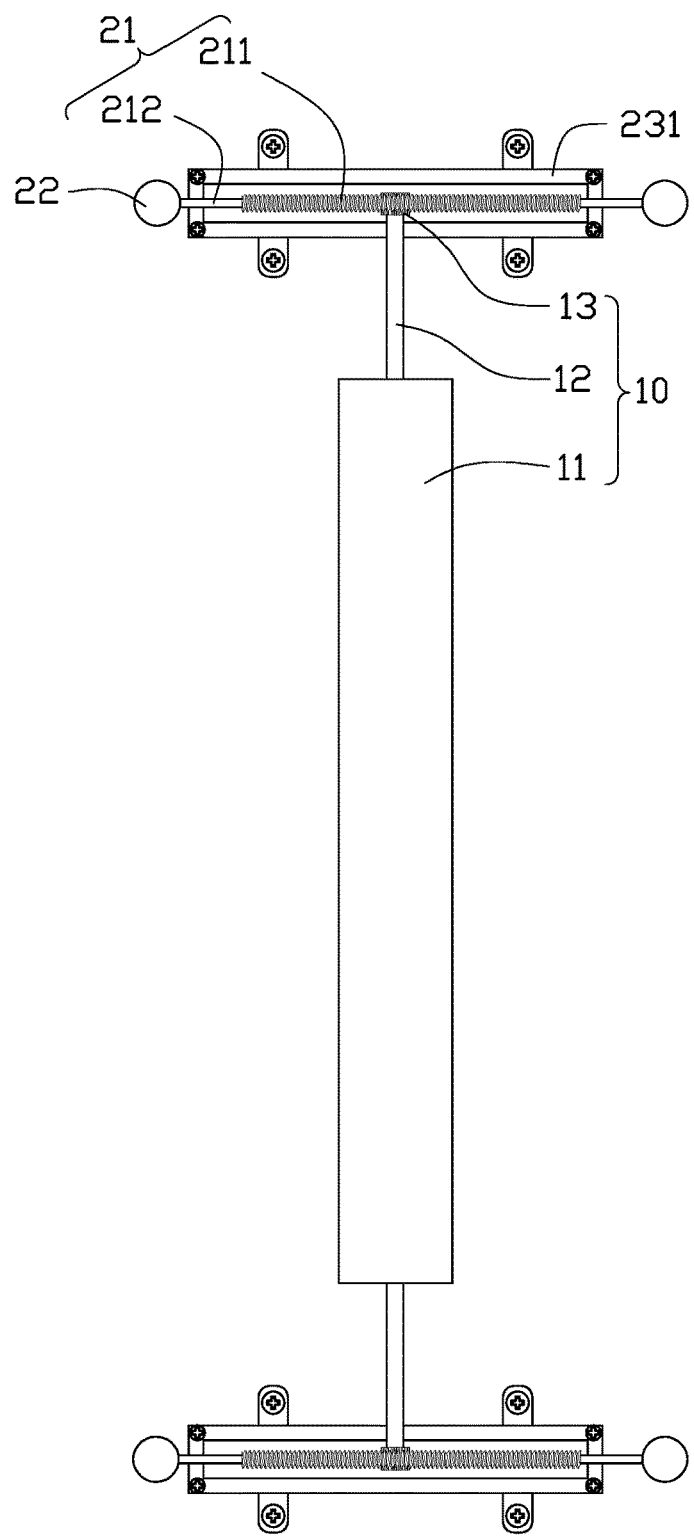
FIG. 5 is a diagrammatic view of the device of FIG. 3 after the gravity center being changed.

Referring to FIG. 4, when the gravity center adjustable device 100 is at initial status, the gear wheel 13 secured to a transmission shaft 12 is connected with the middle part of the rack shaft 211 of a gravity center adjusting member 20. The distances between the two weight balls 22 secured to the gravity center adjusting shaft 21 and the gear wheel 13 connected with the gravity center adjusting shaft 21 are same. The distances between the four weight balls 22 of the gravity center adjustable device 100 and the center of the driving member 10 are same. At initial status, the gravity center of the gravity center adjustable device 100 coincides with the center of the driving member 10.

When the gravity center of the gravity center adjustable device 100 needs to be changed, the gravity center adjustable device 100 is started, the driving main body 11 of the driving member 10 drives the two transmission shafts 12 to revolve on their own axes. The gear wheel 13 secured to each one of the two transmission shafts 12 rotates along with the transmission shaft 12. As the teeth of the rack shaft 211 are engaged with those of the gear wheel 13, the rack shaft 211 moves around along its own axial relative to the gear wheel 13, the gravity center adjusting shaft 21 will slide relative to the gravity center adjusting box 23, thus weight balls 22 move. The weight ball 22 secured at an end of the gravity center adjusting shaft 21 moves close to the gravity center adjusting box 23, and the weight ball 22 secured the other end of the gravity center adjusting shaft 21 moves away from the gravity center adjusting box 23. Thus, the gravity center of the gravity center adjustable device 100 will shift along the direction that the gravity center adjusting shaft 21 and the weight balls 22 move along.

Figure 6:
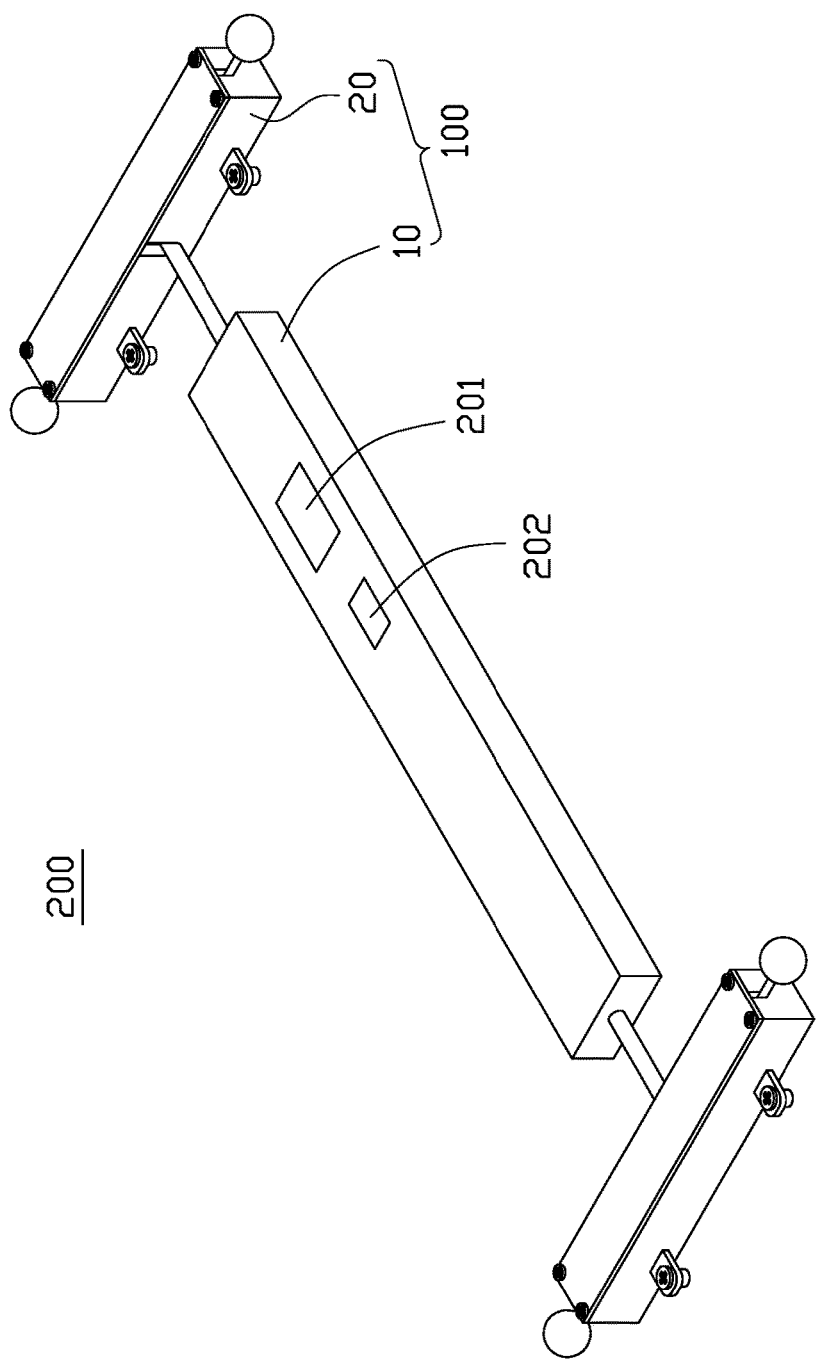
FIG. 6 is a diagrammatic view of an exemplary embodiment of a gravity center self-adjusting device.

FIG. 6 illustrates a gravity center self-adjusting device 200 comprising the gravity center adjustable device 100, a gravity sensor 201, and a processor 202. The gravity sensor 201 is connected with the processor 202, and the processor 202 is connected with the driving member 10 of the gravity center adjustable device 100. The gravity sensor 201 is configured to sense whether the gravity center self-adjusting device 200 has a gravity acceleration, in other words, senses whether the gravity center self-adjusting device 200 is falling, and send the information of whether the gravity center self-adjusting device 200 has a gravity acceleration to the processor 202. The processor 202 is configured to receive the information of whether the gravity center self-adjusting device 200 has a gravity acceleration from the gravity sensor 201, and processes the information. Until the processor 202 receives an information that the gravity center self-adjusting device 200 has a gravity acceleration, the processor 202 does not start the driving member 10. When the processor 202 receives an information that the gravity center self-adjusting device 200 has a gravity acceleration, the processor 202 will start the driving member 10, and the driving member 10 will drive the two gravity center adjusting members 20 to adjust the gravity center of the gravity center self-adjusting device 200.

In at least one exemplary embodiment, both of the gravity sensor 201 and the processor 202 are fixed on the driving member 10 of the gravity center adjustable device 100.

Figure 7:
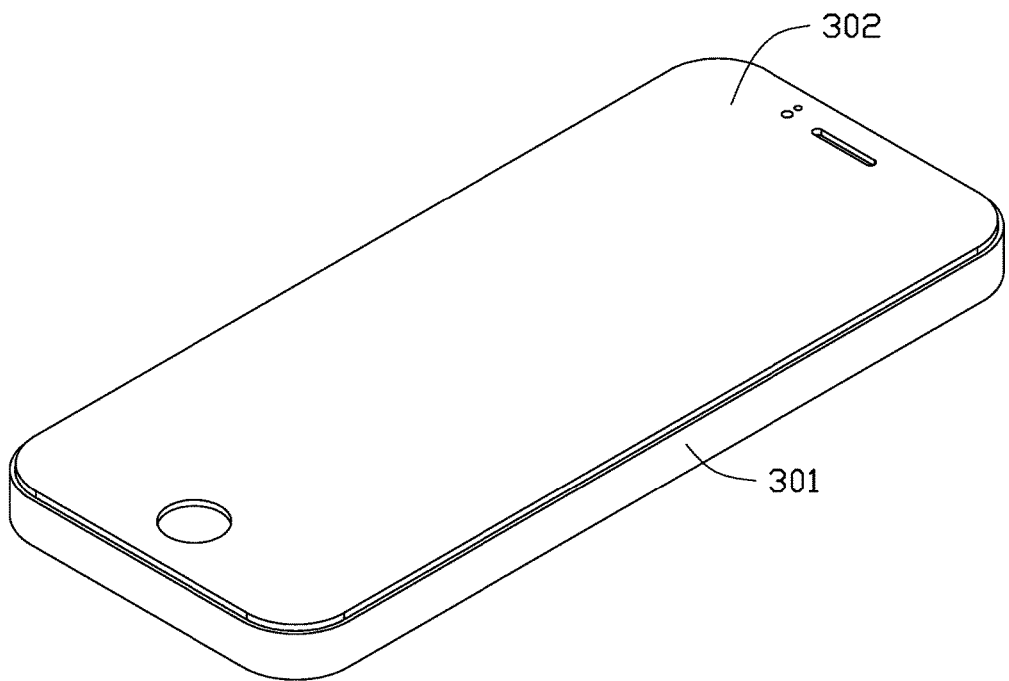
FIG. 7 is a diagrammatic view of an exemplary embodiment of an electronic device.
Figure 8:
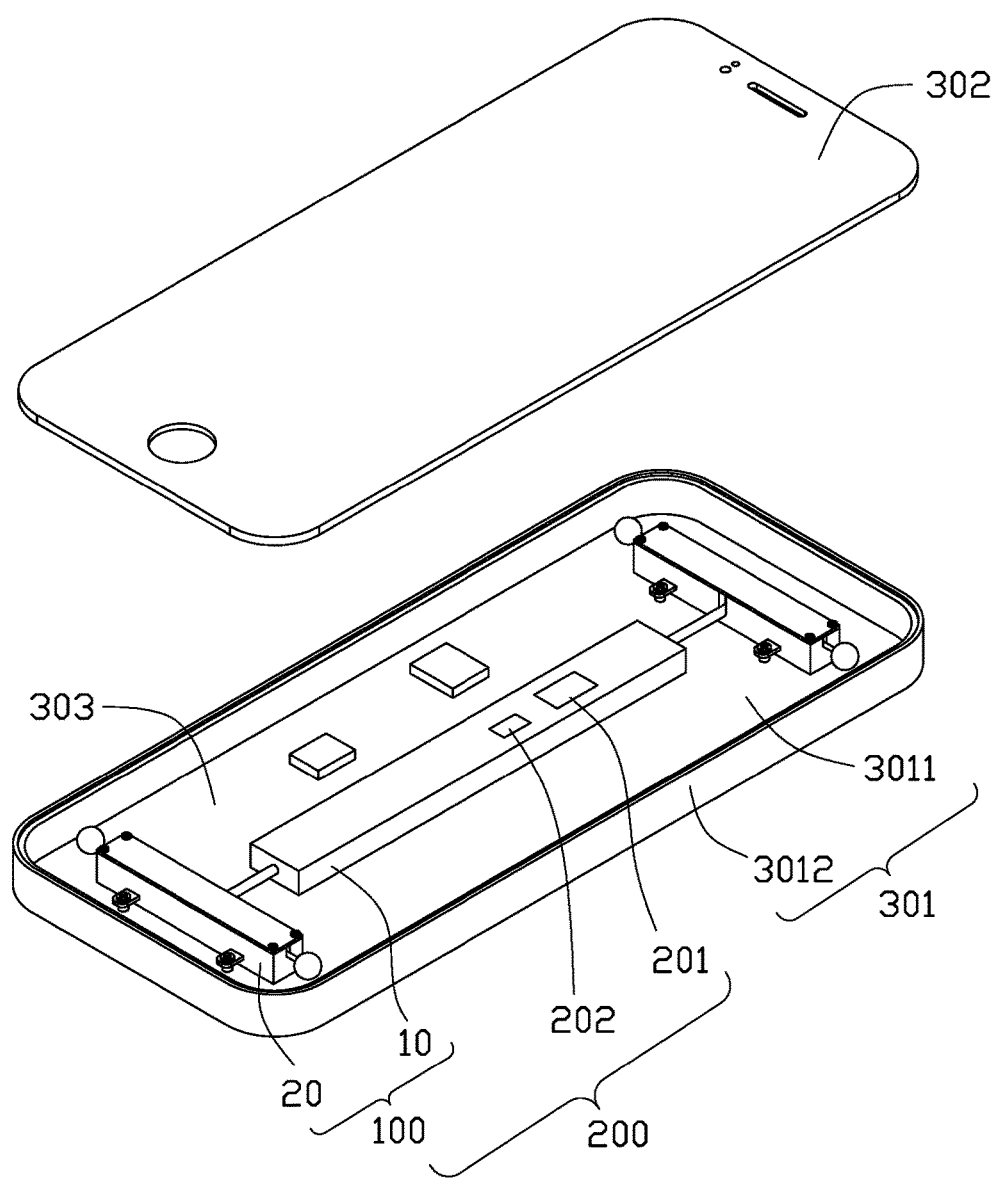
FIG. 8 is an exploded perspective view of the electronic device of FIG. 7.

FIG. 7 and FIG. 8 illustrate an electronic device 300. The electronic device 300 may be a smart phone, a panel computer, or a recreational machine. The electronic device 300 comprises a housing 301, a display screen 302 covering on the housing 301, and a gravity center self-adjusting device 200 secured to the housing 301. The housing 301 and the display screen 302 match to form a receiving space 303, the gravity center self-adjusting device 200 is received in the receiving space 303.

The housing 301 comprises a back plate 3011, and a middle frame 3012 perpendicular to the back plate 3011. The middle frame 3012 is an annular frame. The middle frame 3012 is formed by extending perpendicularly from a border of the back plate 3011. The gravity center self-adjusting device 200 is fixed on the back plate 3011 through the fixing piece 2302 and the second fixing hole 2301.

In at least one exemplary embodiment, the back plate 3011 is made of glass. In other exemplary embodiment, an outer surface of the back plate 3011 is attached to glass panel (not shown).

The middle frame 3012 is maybe made of metal, plastic, or other materials not easily broken.

When the electronic device 300 is falling, the electronic device 300 will have a gravity acceleration, thus the gravity center self-adjusting device 200 secured in the electronic device 300 will have a gravity acceleration. The gravity sensor 201 will sense that the electronic device 300 and the gravity center self-adjusting device 200 have a gravity acceleration, and send the information that the electronic device 300 and the gravity center self-adjusting device 200 have a gravity acceleration to the processor 202. The processor 202 will receive the information, and start the driver member 10, the driving member 10 will drive the two gravity center adjusting members 20 to adjust the gravity center of the electronic device 300, to have the gravity center of the electronic device 300 tilt to one side. This changes the angle of contact between the electronic device 300 and the ground, to ensure that the contact point of the electronic device 300 and the ground is always on the middle frame 3012, to protect the display screen 302 and the back plate 3011 from being broken.

It is to be understood, even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A gravity center adjustable device comprising:
    a driving member comprising a driving main body, two transmission shafts, and two gear wheels, each one of the two transmission shafts comprises a first end secured to the driving main body, and a second end opposite to the first end, each one of the two gear wheels is coiled around the second end of one of the two transmission shafts; and
    two gravity center adjusting members, each one of the two gravity center adjusting members comprises a gravity center adjusting shaft, and two weight balls secured to two opposite ends of the gravity center adjusting shaft respectively;
    wherein the gravity center adjusting shaft comprises a rack shaft, teeth of the rack shaft are engaged with those of one of the two gear wheels, thereby when the one of the two gear wheels rotates, the rack shaft will move around along its own axial relative to the one of the two gear wheels.

2. The gravity center adjustable device of claim 1, wherein each one of the two gravity center adjusting members further comprises a gravity center adjusting box, the gravity center adjusting shaft passes through the gravity center adjusting box, and the two weight balls are outside of the gravity center adjusting box, each one of the two gear wheels is inside of the gravity center adjusting box, the first end of each one of the two transmission shafts is outside of the gravity center adjusting box.

3. The gravity center adjustable device of claim 2, wherein the gravity center adjusting box comprises a box slot, the box slot comprises a bottom wall, two first side walls parallel with each other, a second side wall, and a third side wall parallel with the second side wall, all of the two first side walls, the second side wall, and the third side wall are perpendicular to the bottom wall, the gravity center adjusting shaft slidably and rotatably passes through the two first side walls, each one of the two transmission shafts passes through the second side wall of a box slot, the first end of the transmission shaft is outside of the box slot, the second end of the transmission shaft is inside of the box slot, and the gear wheel coiled around the second end overhangs inside of the box slot.

4. The gravity center adjustable device of claim 3, wherein the gravity center adjusting shaft comprises two smooth shafts secured to two opposite ends of the rack shaft, each one of the weight balls is fixed on an end of one of the two smooth shafts away from the rack shaft, each one of the two smooth shafts passes through one of the two first side walls, the rack shaft is inside of the box slot.

5. The gravity center adjustable device of claim 4, wherein each one of the two first side walls comprises a first notch, the first notch is formed on a side of the each one of the two first side walls away from the bottom wall, each one of the two smooth shafts is slidably and rotatably received in a first notch.

6. The gravity center adjustable device of claim 3, wherein the second side wall comprises a second notch, the second notch is formed on a side of the second side wall away from the bottom wall, each one of the two transmission shafts is rotatably received in the second notch, the first end of each one of the two transmission shafts is outside of the box slot, the second end of each one of the two transmission shafts is inside of the box slot, and each one of the two gear wheels coiled around the second end overhangs inside of the box slot.

7. The gravity center adjustable device of claim 3, wherein the gravity center adjusting box further comprises a box cover, the box cover covers on a side of the box slot away from the bottom wall.

8. A gravity center self-adjusting device comprising:
    a gravity sensor;
    a processor connected with the gravity sensor; and
    a gravity center adjustable device connected with the processor, the gravity center adjustable device comprising:
        a driving member comprising a driving main body, two transmission shafts, and two gear wheels, each one of the two transmission shafts comprises a first end secured to the driving main body, and a second end opposite to the first end, each one of the two gear wheels is coiled around the second end of one of the two transmission shafts; and
        two gravity center adjusting members, each one of the two gravity center adjusting members comprises a gravity center adjusting shaft, and two weight balls secured to two opposite ends of the gravity center adjusting shaft respectively;
    wherein the gravity center adjusting shaft comprises a rack shaft, teeth of the rack shaft are engaged with those of one of the two gear wheels, thereby when the one of the two gear wheels rotates, the rack shaft will move around along its own axial relative to the one of the two gear wheels;
    wherein the processor is connected with the driving member, gravity sensor is configured to sense whether the gravity center self-adjusting device has a gravity acceleration, and send the information of whether the gravity center self-adjusting device has a gravity acceleration to the processor, the processor is configured to receive the information of whether the gravity center self-adjusting device has a gravity acceleration from the gravity sensor, and processes the information, until the processor receives an information that the gravity center self-adjusting device has a gravity acceleration, the processor does not start the driving member, when the processor receives an information that the gravity center self-adjusting device has a gravity acceleration, the processor starts the driving member, and the driving member drives the two gravity center adjusting members to adjust the gravity center of the gravity center self-adjusting device.

9. The gravity center self-adjusting device of claim 8, wherein each one of the two gravity center adjusting members further comprises a gravity center adjusting box, the gravity center adjusting shaft passes through the gravity center adjusting box, and the two weight balls are outside of the gravity center adjusting box, each one of the two gear wheels is inside of the gravity center adjusting box, the first end of each one of the two transmission shafts is outside of the gravity center adjusting box.

10. The gravity center self-adjusting device of claim 9, wherein the gravity center adjusting box comprises a box slot, the box slot comprises a bottom wall, two first side walls parallel with each other, a second side wall, and a third side wall parallel with the second side wall, all of the two first side walls, the second side wall, and the third side wall are perpendicular to the bottom wall, the gravity center adjusting shaft slidably and rotatably passes through the two first side walls, each one of the two transmission shafts passes through the second side wall of a box slot, the first end of the transmission shaft is outside of the box slot, the second end of the transmission shaft is inside of the box slot, and the gear wheel coiled around the second end overhangs inside of the box slot.

11. The gravity center self-adjusting device of claim 10, wherein the gravity center adjusting shaft comprises two smooth shafts secured to two opposite ends of the rack shaft, each one of the weight balls is fixed on an end of one of the two smooth shafts away from the rack shaft, each one of the two smooth shafts passes through one of the two first side walls, the rack shaft is inside of the box slot.

12. The gravity center self-adjusting device of claim 11, wherein each one of the two first side walls comprises a first notch, the first notch is formed on a side of the each one of the two first side walls away from the bottom wall, each one of the two smooth shafts is slidably and rotatably received in a first notch.

13. The gravity center self-adjusting device of claim 10, wherein the second side wall comprises a second notch, the second notch is formed on a side of the second side wall away from the bottom wall, each one of the two transmission shafts is rotatably received in the second notch, the first end of each one of the two transmission shafts is outside of the box slot, the second end of each one of the two transmission shafts is inside of the box slot, and each one of the two gear wheels coiled around the second end overhangs inside of the box slot.

14. The gravity center self-adjusting device of claim 10, wherein the gravity center adjusting box further comprises a box cover, the box cover covers on a side of the box slot away from the bottom wall.

15. An electronic device comprising:
a housing;
a display screen covering on the housing, the housing and the display screen match to form a receiving space; and
a gravity center self-adjusting device received in the receiving space, the gravity center self-adjusting device comprising:
a gravity sensor;
a processor connected with the gravity sensor; and
a gravity center adjustable device connected with the processor, the gravity center adjustable device comprising:

a driving member comprising a driving main body, two transmission shafts, and two gear wheels, each one of the two transmission shafts comprises a first end secured to the driving main body, and a second end opposite to the first end, each one of the two gear wheels is coiled around the second end of one of the two transmission shafts; and
two gravity center adjusting members, each one of the two gravity center adjusting members comprises a gravity center adjusting shaft, and two weight balls secured to two opposite ends of the gravity center adjusting shaft respectively;
wherein the gravity center adjusting shaft comprises a rack shaft, teeth of the rack shaft are engaged with those of one of the two gear wheels, thereby when the one of the two gear wheels rotates, the rack shaft will move around along its own axial relative to the one of the two gear wheels;
wherein the processor is connected with the driving member, gravity sensor is configured to sense whether the electronic device has a gravity acceleration, and send the information of whether the electronic device has a gravity acceleration to the processor, the processor is configured to receive the information of whether the electronic device has a gravity acceleration from the gravity sensor, and processes the information, until the processor receives an information that the electronic device has a gravity acceleration, the processor does not start the driving member, when the processor receives an information that the electronic device has a gravity acceleration, the processor starts the driving member, and the driving member drives the two gravity center adjusting members to adjust the gravity center of the electronic device.

16. The electronic device of claim 15, wherein each one of the two gravity center adjusting members further comprises a gravity center adjusting box, the gravity center adjusting shaft passes through the gravity center adjusting box, and the two weight balls are outside of the gravity center adjusting box, each one of the two gear wheels is inside of the gravity center adjusting box, the first end of each one of the two transmission shafts is outside of the gravity center adjusting box.

17. The electronic device of claim 16, wherein the gravity center adjusting box comprises a box slot, the box slot comprises a bottom wall, two first side walls parallel with each other, a second side wall, and a third side wall parallel with the second side wall, all of the two first side walls, the second side wall, and the third side wall are perpendicular to the bottom wall, the gravity center adjusting shaft slidably and rotatably passes through the two first side walls, each one of the two transmission shafts passes through the second side wall of a box slot, the first end of the transmission shaft is outside of the box slot, the second end of the transmission shaft is inside of the box slot, and the gear wheel coiled around the second end overhangs inside of the box slot.

18. The electronic device of claim 17, wherein the gravity center adjusting shaft comprises two smooth shafts secured to two opposite ends of the rack shaft, each one of the weight balls is fixed on an end of one of the two smooth shafts away from the rack shaft, each one of the two smooth shafts passes through one of the two first side walls, the rack shaft is inside of the box slot.

19. The electronic device of claim 18, wherein each one of the two first side walls comprises a first notch, the first notch is formed on a side of the each one of the two first side walls away from the bottom wall, each one of the two smooth shafts is slidably and rotatably received in a first notch.

20. The electronic device of claim 17, wherein the second side wall comprises a second notch, the second notch is formed on a side of the second side wall away from the bottom wall, each one of the two transmission shafts is rotatably received in the second notch, the first end of each one of the two transmission shafts is outside of the box slot, the second end of each one of the two transmission shafts is inside of the box slot, and each one of the two gear wheels coiled around the second end overhangs inside of the box slot.

21. The electronic device of claim 17, wherein the gravity center adjusting box further comprises a box cover, the box cover covers on a side of the box slot away from the bottom wall.

\* \* \* \* \*